A. ROSENTHAL.
SELF FEEDER FOR CORN HUSKING AND SHREDDING MACHINES.
APPLICATION FILED APR. 27, 1910.

1,142,844.

Patented June 15, 1915.

WITNESSES.
O. F. Miller.
L. C. French.

INVENTOR
August Rosenthal
By Morsell, Keeney & French
ATTORNEYS

UNITED STATES PATENT OFFICE.

AUGUST ROSENTHAL, OF WEST ALLIS, WISCONSIN.

SELF-FEEDER FOR CORN HUSKING AND SHREDDING MACHINES.

1,142,844.  Specification of Letters Patent.  Patented June 15, 1915.

Application filed April 27, 1910. Serial No. 558,078.

*To all whom it may concern:*

Be it known that I, AUGUST ROSENTHAL, residing in West Allis, in the county of Milwaukee and State of Wisconsin, have invented new and useful Improvements in Self-Feeders for Corn Husking and Shredding Machines, of which the following is a description, reference being had to the accompanying drawings, which are a part of this specification.

This invention relates to improvements in self feeders and more particularly to self feeders used in connection with corn husking and shredding machines.

One of the objects of this invention is to provide a self feeder which is adapted to cut the bands and feed bundles of corn stalks to the husking rolls of corn husking and shredding machines.

A further object of the invention is to provide a self feeder with means for providing a steady even feed of material to the husking rolls and which will prevent the machine from becoming choked or inoperative when an excess amount of material is fed to the machine.

A further object of the invention is to provide a self feeder with means for feeding material to the husking rolls, which will, in case the husking rolls do not grasp the material when first fed thereto, continue to move and present the material to the rolls until it is finally grasped by and passed between the said rolls.

With the above, and other objects in view, the invention consists of the self feeder and its parts and combinations as set forth in the claims.

Figure 1:
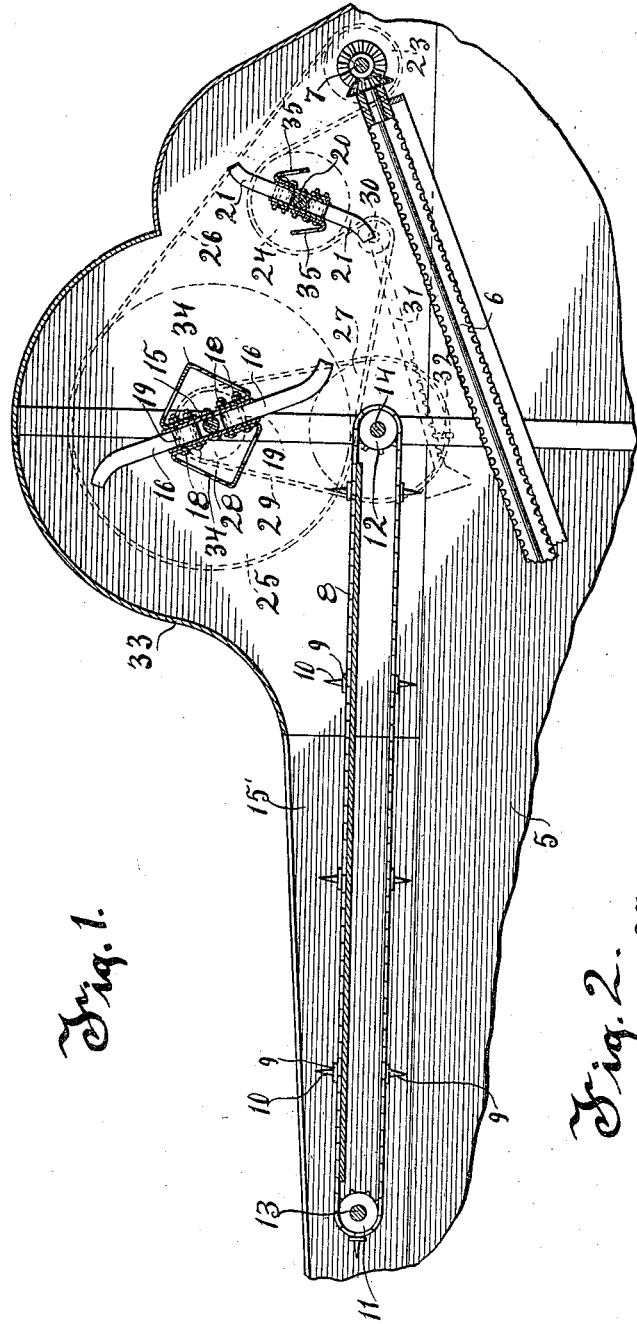
Figure 2:
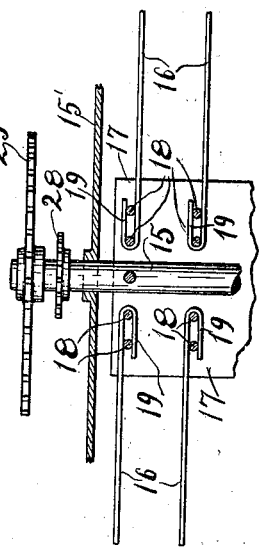

In the accompanying drawing in which the same reference characters indicate the same parts in all of the views, Figure 1 is a central vertical longitudinal sectional view of the improved feeder shown in connection with a fragmentary portion of a corn husking and shredding machine; and, Fig. 2 is a horizontal sectional detail view thereof.

Referring to the drawing the numeral 5 indicates a fragment of a corn husking machine and 6 one of the inclined husking rolls thereof which is provided with the usual husking and snapping means.

The husking rolls (only one of which is shown) are rotated by a bevel gear connection with the drive shaft 7 extending transversely across the machine.

An endless conveyer 8 horizontally positioned and extending above the husking rolls is provided with transverse slats 9 having material engaging teeth 10 projecting therefrom. The endless conveyer which is supported on and rotated by sprocket wheels 11 and 12 mounted on the shafts 13 and 14 respectively is adapted to convey and feed bundles of corn stalks to the husking rolls. A shaft 15 extending transversely across the frame 15' of the feeder and positioned above the inner end of the endless conveyer is provided with a plurality of curved knives or cutters 16 which are adapted to be rotated in a direction opposite to the direction of rotation of the conveyer to cut the bands of the bundles of corn fed to the husking rollers and to also serve as a kicker to retard or hold back a portion of the corn stalks from passing between the conveyer and the cutters when an excess amount is being fed to the conveyer.

The knives or cutters 16 are adjustably connected to the shaft by means of knife holding plates 17 positioned on each side of the shaft and bolted thereto and connected together by bolts 18 which extend through said plates and through the loops 19 of the looped inner ends of the knives 16 positioned and clamped between the said plates by the bolts. The looped portions of the inner ends of the knives are of sufficient length to permit their endwise adjustment so that their circumferential paths of movement may be increased or diminished as desired.

Another shaft 20 positioned above the upper ends of the husking rolls and at a short distance from the band cutter is provided with fingers or beater knives 21 forming a beater 22 which is adapted to engage the material and pull it toward the husking rolls. The beater 22 rotates in the opposite direction with relation to the direction of rotation of the band cutter so that material carried forward by the conveyer and in part retarded by the band cutter will be engaged, separated and moved toward the husking rolls by the beater. The major part of the material thus moved will be grasped by the husking rolls and the part not grasped by said rolls will be carried around with the beater and again presented to the rolls and finally engaged thereby. The construction of the beater is similar to the band cutter in the manner of fastening and providing for the adjustability of the curved knives except that the parts are made somewhat smaller in size.

The rotating parts of the self feeder may be connected up to rotating parts of the corn husking machine in any manner desired but is preferably operated from the main drive of the husking machine by means of a sprocket chain and wheel drive as shown in the drawings. In this preferred construction the main drive shaft, the beater shaft and the band cutter shaft are provided with sprocket wheels 23, 24 and 25 respectively and a sprocket chain 26 is connected to said sprocket wheels to impart rotation thereto from the main drive. The rear conveyer shaft 14 is provided with a sprocket wheel 27 and a sprocket wheel 28 mounted on the band cutter shaft 15 is connected thereto by a sprocket chain 29. The relative size of the different sprocket wheels is adapted to rotate the band cutter at a slower rate of speed than the beater and cause the conveyer to travel at a slower speed than the band cutter to give best results although the relative degrees of speed may be changed without departing from the spirit and scope of the invention. A chain tightener 30 provided with a toothed handle 31 is adapted to engage a holding plate 32 fastened to the side of the husking machine to hold said tightener in positions of adjustment. The feeder frame is provided with a top portion 33 to cover the rotating parts of the machine which may be shaped as desired. Guards 34 positioned between the knives of the band cutter are adapted to deflect the material away from the shafts of the band cutter and prevent the material from being carried upwardly with the knives. The beater 22 is also provided with deflecting guards 35 in the form of angle plates which serve to prevent the material from winding closely around the holding plates of the beater.

From the foregoing description it will be seen that bundles of corn stalks thrown on the conveyer will be carried thereby and engaged by the band cutter which will cut the bands and permit a portion of the stalks to pass to the husking rolls and retard the feed of the balance of the stalks, the amount retarded depending upon the rate of feed. The stalks in passing to the husking rolls are engaged by the beater knives and if any of the bands escape the knives of the band cutter they will be cut by beater cutters, and if the stalks are not grasped by the rolls when first presented they will be carried around with the beater cutters and again placed in position to be engaged by said rolls, thus preventing the corn stalks from clogging up the machine.

What I claim as my invention is:

1. In combination with a corn husking machine provided with husking rolls and driving mechanism therefor, of means for feeding material to said rolls, comprising an endless feed belt, a rotary cutter adjacent the feed belt, a rotary beater positioned above the husking rolls, and means connected to said driving mechanism for simultaneously driving said cutter and beater in opposite directions.

2. In combination with a corn husking machine provided with husking rolls and driving mechanism therefor, of means for feeding material to said rolls, comprising an endless feed belt, a rotary cutter adjacent the feed belt, a rotary beater positioned above the husking rolls, means connected to said driving mechanism for simultaneously driving said cutter and beater in opposite directions, and means connecting said cutter and feed belt to drive said feed belt in a direction opposite to that of the cutter during the operation of the feeding mechanism.

In testimony whereof, I affix my signature, in presence of two witnesses.

AUGUST ROSENTHAL.

Witnesses:
C. H. KEENEY,
ALMA A. KLUG.

Copies of this patent may be obtained for five cents each, by addressing the "Commissioner of Patents, Washington, D. C."